(12) United States Patent
Poulis et al.

(10) Patent No.: US 9,515,497 B2
(45) Date of Patent: Dec. 6, 2016

(54) BATTERY MODULE ARCHITECTURE WITH HORIZONTAL AND VERTICAL EXPANDABILITY

(71) Applicant: Elitise LLC, Tucson, AZ (US)

(72) Inventors: Spiro Poulis, Tucson, AZ (US); Kagum G. Zakharyan, Tucson, AZ (US); Sergei N. Begliarov, Tucson, AZ (US)

(73) Assignee: Elitise LLC, Tucson, AZ (US)

( * ) Notice: Subject to any disclaimer, the term of this patent is extended or adjusted under 35 U.S.C. 154(b) by 0 days.

(21) Appl. No.: 14/924,126

(22) Filed: Oct. 27, 2015

(65) Prior Publication Data

US 2016/0294198 A1    Oct. 6, 2016

Related U.S. Application Data

(63) Continuation of application No. PCT/US2015/024027, filed on Apr. 2, 2015.

(60) Provisional application No. 62/059,461, filed on Oct. 3, 2014.

(51) Int. Cl.
  *H02J 7/00* (2006.01)
  *H01M 10/46* (2006.01)
  *H01M 10/44* (2006.01)

(52) U.S. Cl.
  CPC .......... *H02J 7/0021* (2013.01); *H01M 10/441* (2013.01); *H01M 10/46* (2013.01); *H02J 7/0016* (2013.01); *H02J 7/0045* (2013.01); *H02J 2007/0096* (2013.01)

(58) Field of Classification Search
  CPC ...... H02J 7/0021; H02J 7/0016; H02J 7/0045; H02J 7/0031; H02J 2007/004; H02J 2007/0037; H02J 7/0024; H02J 7/1423; H01M 10/441; H01M 10/46; H01M 10/48; Y02E 60/12; Y02T 10/7005

USPC .......................................................... 320/112
See application file for complete search history.

(56) References Cited

U.S. PATENT DOCUMENTS

| | | | |
|---|---|---|---|
| 5,847,912 A * | 12/1998 | Smith | H02J 7/0031 361/115 |
| 6,133,712 A | 10/2000 | Yeon | |
| 2002/0079428 A1 | 6/2002 | Meadows | |
| 2004/0135552 A1 | 7/2004 | Wolin et al. | |
| 2004/0257042 A1 * | 12/2004 | Liu | H01M 10/441 320/130 |
| 2005/0024015 A1 * | 2/2005 | Houldsworth | H02J 7/0016 320/119 |
| 2008/0042621 A1 | 2/2008 | Miglioranza | |
| 2009/0087722 A1 | 4/2009 | Sakabe et al. | |
| 2011/0080139 A1 | 4/2011 | Troxel et al. | |
| 2011/0298414 A1 | 12/2011 | Manor et al. | |
| 2012/0235642 A1 | 9/2012 | Mao et al. | |
| 2013/0334878 A1 | 12/2013 | Brabec | |
| 2014/0129162 A1 * | 5/2014 | Hallman | G01R 31/3606 702/63 |
| 2014/0132217 A1 * | 5/2014 | Kim | H02J 7/0016 320/118 |
| 2014/0333267 A1 * | 11/2014 | Crawley | H02J 7/0052 320/150 |

\* cited by examiner

*Primary Examiner* — Arun Williams
(74) *Attorney, Agent, or Firm* — Venjuris P.C.; Michael F. Campillo

(57) ABSTRACT

A battery module architecture including a plurality of battery cells coupled electrically in series and having a combined battery potential proportional to the combined sum of the battery cells is controlled by microcontroller to balance battery cell voltages by a battery cell voltage balancer having a discharging circuit and a plurality of differential conductive connections each respectively coupled to positive and negative terminals of one of the battery cells.

6 Claims, 2 Drawing Sheets

BATTERY MODULE ARCHITECTURE WITH HORIZONTAL AND VERTICAL EXPANDABILITY

FIELD OF THE INVENTION

The present invention relates to battery module architectures that facilitate use of battery chemistries, such as lithium-based batteries, that are intended as replacements for lead-acid based batteries. Additionally, the present invention relates to battery architectures that facilitate creation of an aggregate battery module that is comprised of a plurality of independently housed battery modules.

BACKGROUND OF THE INVENTION

Lithium based batteries have grown in popularity over lead-acid batteries due to their relatively small size and weight compared to lead-acid batteries of similar capacity. Although common in small devices such as cellular phones and cameras, lithium based battery use is becoming more common to power larger loads such as electric cars.

An enclosed battery module, such as those used to start internal combustion engines, typically consist of multiple battery cells coupled together to meet the power requirements of the application. For example, in a battery application requiring 12 VDC, a battery module may consist of four battery cells of at least 3 volts electrically coupled together in series to sum the cell voltages for the battery module. Several lead acid battery cells may be "stacked" or connected electrically in series by a simple conductor to sum the individual cell voltages to create a lead acid battery module that meets the vehicle power requirements. When the vehicle is started, current is drawn from the lead acid battery module to power the starter motor and start the internal combustion engine. Starting operations result in a significant power drain that replenished by an alternator that recharges the battery module to power engine electronics and future vehicle starts. This simple but effective system however is not sufficient for all battery technologies. Lithium-Ion batteries for example present special challenges for vehicle installations and in other similar applications where the re-charge voltage and current are less than constant. Lithium-Ion batteries have low tolerance for overcharge and should be charged with controlled voltage and current to deter degradation or damage to the cells.

Generally, equalization of the battery cell charges during charging operations avoids battery cell over-charge. Lithium-Ion battery systems therefore commonly include smart circuitry that compares and balances the charge on each Lithium-Ion battery cells to prevent overcharge of individual battery cells during charging operations. One common prior art solution includes battery cell balancing circuitry that is coupled to the individual battery cells and that permits controlled discharge of individual battery cells. The battery cell balancing circuitry samples and compares each of the individual battery cell voltages to each of the other battery cell voltages (or a reference voltage) and balances or discharges individual battery cells having charges that exceed the lowest charged battery cell. This technique typically includes measuring each battery cell charge and producing corrective charging feedback in a control loop that causes a discharge of individual battery cells to match the charge on other cells.

U.S.2009/0087722 to Sakabe et al. ("Sakabe") discloses an example of a battery module as described and includes the charge balancing circuitry described. Sakabe discloses a vehicle power supply system battery module comprised of the accumulated battery cell potentials from three distinct but identical battery cell subunits that are hard-wired electrically in series to deliver power from all of the battery cells. Similarly, the Sakabe battery module is charged by current that is delivered to all of the serially connected battery cells. Sakabe's battery module however would be non-functional should any of the Sakabe battery cells or subunits fail.

A vehicle battery system with a backup capability is described in U.S.20120235642 to Mao et al. ("Mao") wherein a battery module is comprised of subunits having a battery cell and a super-capacitor connectable in parallel as back-up or alternative power. In certain conditions, the battery cell charge may be insufficient to start a vehicle but have enough residual charge to charge a super-capacitor that can discharge very quickly and start a vehicle, or be used when the battery cell temperature is too cold or too hot and unable to deliver sufficient charge to start a car engine. As an example, Mao discloses a number of battery cells connected electrically in series to accumulate a battery module potential that is connected to an alternator to maintain the charge on the battery cells. An ultracapacitor pack comprised of several ultracapacitors electrically in series is then connected in parallel with the battery cells to provide a short and high current for starting the vehicle. Again however, if any of the battery cell(s) or super-capacitor(s) falters, the Mao battery module performance suffers or fails altogether.

Accordingly, there remains a need for improvements in battery module architectures and management strategies to facilitate use of lithium-based batteries chemistries in applications where lead-acid based battery use currently dominates.

SUMMARY OF THE INVENTION

The present disclosure includes improvements to battery architectures to enhance the functionality, safety and battery life of batteries. The resulting battery architecture facilitates the use of battery chemistries, such as Lithium, in battery modules intended as substitutes for lead-acid based battery modules.

The present disclosure includes a battery module architecture comprising a multi-cell battery control circuit. The battery module generally includes a plurality of battery cells coupled electrically in series and having a combined battery potential proportional to the combined sum of the battery cells. The circuit may include a microcontroller, and a battery cell voltage balancer having a discharging circuit and a plurality of differential conductive connections each respectively coupled to positive and negative terminals of one of the battery cells. The balancer may have at least one cell balancing output and at least one cell balancing input to transmit and receive cell voltage balancing information to and from the microcontroller, respectively. A battery charger, as enabled by the microcontroller, may be coupled to the positive battery terminal and have a charger output that is coupled to the series-coupled battery cells. A contactor may be coupled between the combined battery potential and the battery positive terminal and have a control input coupled to the microcontroller. The contactor may have a closed state that permits current to flow between the combined battery potential and the positive battery terminal, and an open state that prohibits current flow between the combined battery potential and the positive battery terminal. A communications link may be connected to the microcontroller to enable communication of the battery module information to one or more remote transceivers outside of the battery housing.

The contactor may be coupled to a bi-directional current sensing circuit with a current sense element coupled between the combined battery potential and the positive battery terminal, and an output coupled to the microcontroller. The bi-directional current sensing circuit may also include a current-to-voltage converter that produces an output that is representative of the polarity of the current flowing through the current sense element, the output coupled to the microcontroller. The bi-directional current sensing circuit may include a current-to-voltage converter that a produces at least one output that is representative of the polarity of the current flowing through the current sense element. The current-to-voltage converter may for example produce both digital and analog outputs. Moreover, at least one output or outputs are coupled to the microcontroller. The battery module may include a low power current path coupled parallel to the contactor to power engine computers and the like when the contactor is in the open state. A thermistor and heater may be coupled to the microcontroller and positioned in thermal communication with the plurality of battery cells to both measure and affect the temperature of the battery cells based on input from the microcontroller.

Additional aspects of the disclosure include a method of managing a battery module having a plurality of battery cells, comprising opening the contactor to create an open circuit between the accumulated battery cell voltage and the positive battery terminal. Depending on the application or embodiment, opening of the contactor is upon detection of an occurrence of a fault condition selected from over-current flowing through the contactor, or over-voltage at the plurality of battery cells, the positive battery terminal, or the contactor. The method may also or alternately include use of a bi-directional sensing circuit and a current-sense element to sense the magnitude of the current flowing at the positive terminal of the battery module to determine if the magnitude of the current exceeds a reference current, and opening the contactor and create an open circuit between the plurality of battery cells and the positive battery terminal if the magnitude of the current exceeds the reference current. The method may also include charging the plurality of battery cells from the charger if the current exceeds the reference current. The method may include also reading the temperature of the plurality of battery cells, comparing the temperature of the plurality of battery cells to a reference temperature, and charging the plurality of battery cells from the charger if the temperature of the plurality of battery cells exceeds the reference temperature. The method may also include heating the plurality of battery cells if the temperature of the plurality of battery cells is less than the reference temperature.

The method may alternately include sensing the magnitude of the voltage at the positive terminal of the battery module to determine if the voltage exceeds a reference voltage and activating the contactor to open the contactor and create an open circuit between the plurality of battery cells and the positive battery terminal if the magnitude of the voltage exceeds the reference voltage.

The battery module may also include a communication link coupled to a receiver external to the battery module, and the method further include sensing an original accumulated battery cell voltage, detecting each occurrence wherein the accumulated battery cell voltage decreases at least twenty percent below the original accumulated battery cell voltage, and transmitting via the communication link an indication of each occurrence wherein the accumulated battery cell voltage decreased at least twenty percent below the original accumulated battery cell voltage to the receiver. The method may further include detecting each subsequent occurrence wherein the accumulated battery cell voltage increases above the original accumulated battery cell voltage, detecting each subsequent occurrence wherein the accumulated battery cell voltage decreases to a voltage that is within five percent of the original accumulated battery cell voltage, and transmitting via the communication link an indication of each occurrence wherein the accumulated battery cell voltage decreases to a voltage that is within five percent of the original accumulated battery cell voltage to the receiver.

The method may also be used in an aggregate battery module wherein the battery module comprises a master battery module of a plurality of battery modules wherein the plurality of battery modules have the positive battery terminals coupled together and the negative battery terminals coupled together, respectively, the method comprising opening at least one of the contactors at a time so that N−1 or fewer contactors are closed and sourcing current from the N−1 or fewer battery modules, or alternatively, opening at least one of the contactors at a time so that N−1 or fewer contactors are closed and charging the N−1 or fewer battery modules. The method may further include sampling the voltages on the plurality of battery cells in each of the other plurality of battery modules, storing the sampled voltages on the plurality of battery cells in each of the other plurality of battery modules in memory, communicating the voltages sampled in each of the other plurality of battery modules to the master battery module, comparing the sampled voltages in the plurality of battery modules to determine a battery module and a battery cell within having a lowest sampled voltage, and discharging the battery cells in all of the battery modules that have battery cell voltages greater than the lowest sampled voltage until the battery cells in the plurality of battery cells have substantially the same voltage as the lowest sampled battery cell voltage. The method to create an aggregate battery module may include coupling a subset of the plurality of battery modules electrically in series or in parallel to achieve alternate power capabilities.

The method may also be used with an aggregate battery module wherein the battery module comprises a master battery module of a plurality of battery modules, each of the plurality of battery modules has a plurality of battery cells having an accumulated battery voltage coupled to a positive battery terminal though a contactor. The method may include opening at least one of the contactors at a time so that N−1 or fewer contactors are closed during battery operations. And further, the method may also include opening at least one of the contactors at a time so that N−1 or fewer contactors are closed during battery charging operations. During charging operations, the method may further include sampling the voltages on the plurality of battery cells in each of the other plurality of battery modules, communicating the voltages sampled in each of the other plurality of battery modules to the master battery module, comparing the sampled voltages in the plurality of battery modules to determine a battery module and a battery cell within having a lowest sampled voltage, and consequently discharging the battery cells in all of the battery modules that have battery cell voltages greater than the lowest sampled voltage until the battery cells in the plurality of battery cells have substantially the same voltage as the lowest sampled battery cell voltage.

The disclosure also enables an aggregate battery that may contain a plurality of battery modules each including a positive battery terminal and a negative battery terminal, where a first subset of the plurality of battery modules have the positive battery terminals coupled together and the negative battery terminals coupled together, respectively, the communications link of each of the first subset wirelessly coupled to the communication link in at least one of the other battery modules in the first subset. The plurality of battery cells of each battery module may be coupled in series to create an accumulated battery cell voltage for each battery module that is applied to the positive battery terminal. A contactor may be coupled between the positive battery terminal and the accumulated battery cell voltage, and it may have an open state that prohibits current flow and a closed state that permits current flow between the positive battery terminal and the accumulated battery cell voltage. A charger may be coupled between the positive battery terminal and the accumulated battery cell voltage, and a microcontroller coupled to and controlling the charger and the contactor, respectively. A communications link may be coupled to the microcontroller to communicate with at least one other of the plurality of battery modules.

The aggregate battery may alternately include a second subset of the plurality of battery modules having the positive battery terminals coupled together and the negative battery cells coupled together. The communications link of each of the second subset may be wirelessly coupled with the communication link in at least one of the other battery modules. The negative terminals of the second subset may be coupled to the positive battery terminals of the first subset and each of the second subset of the plurality of battery modules may be wirelessly coupled with the communication link in one of the battery modules in the first subset.

DESCRIPTION OF PREFERRED EMBODIMENTS

Figure 1:
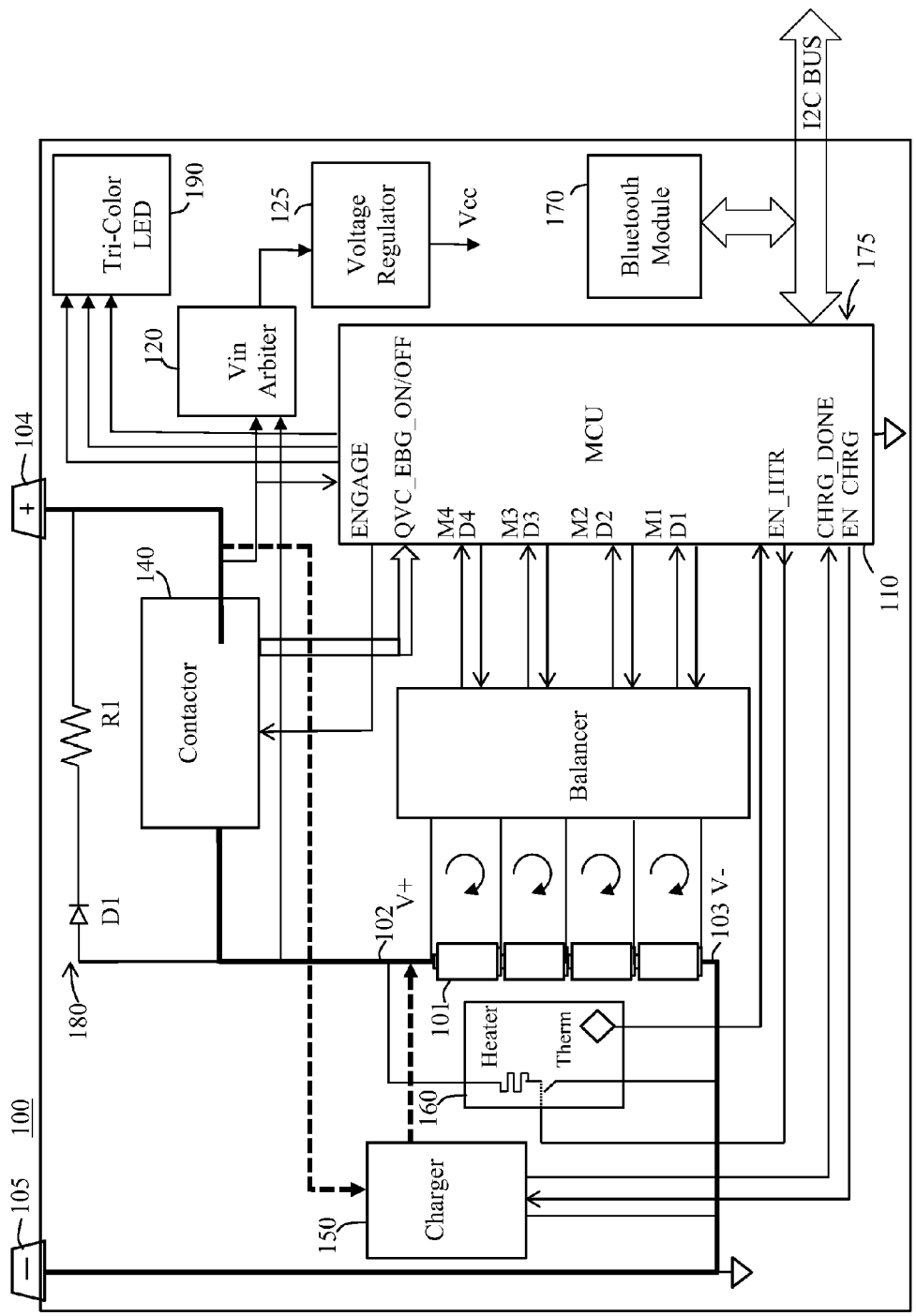
FIG. 1 illustrates a battery module 100 incorporating aspects of the present disclosure.
Figure 2:
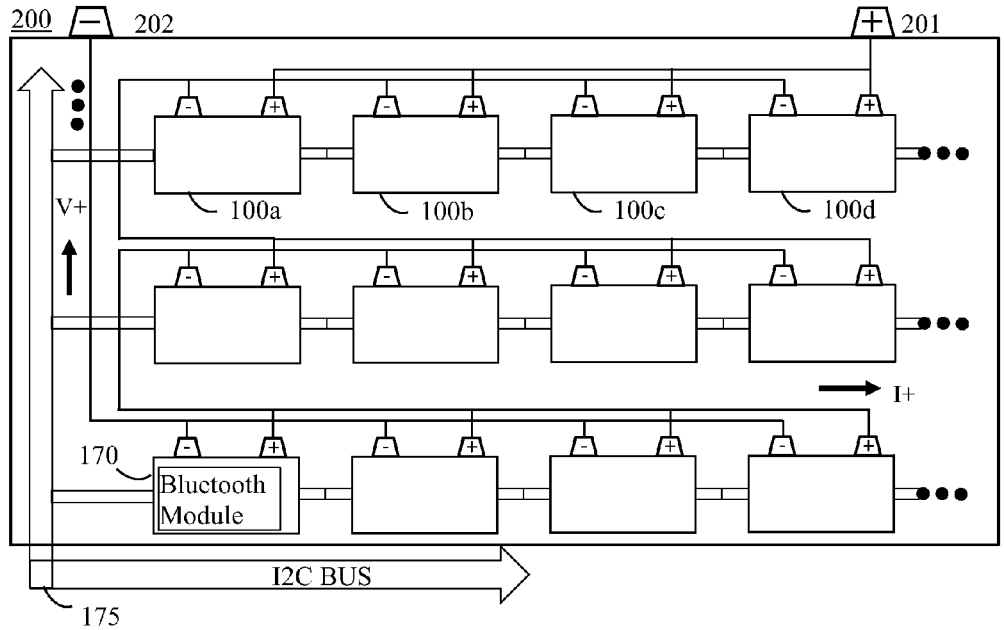
FIG. 2 illustrates an aggregate battery module 200 comprising a plurality of battery modules 100, wherein a first subset of battery modules 100 are electrically coupled in parallel to each other, and second subset of battery modules 100 are electrically coupled in parallel to each other, a third subset of battery modules 100 are electrically coupled in parallel to each other, the first subset of battery modules coupled in series with the second subset of battery modules, and the third subset of battery modules connected in series with the second subset of battery modules.
Figure 3:
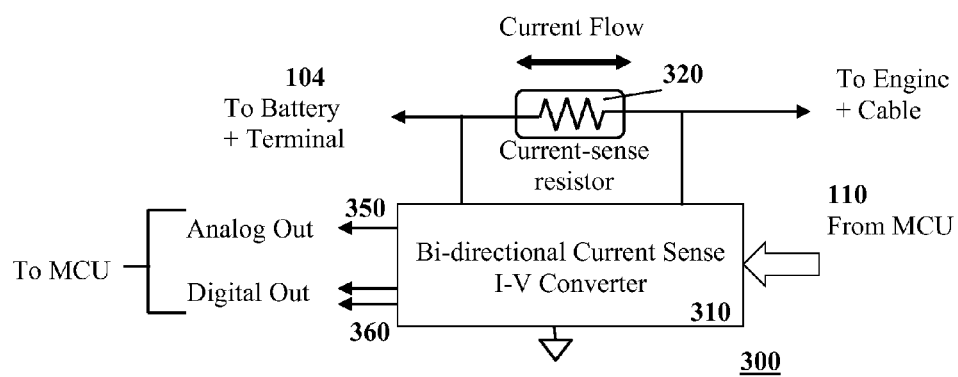
FIG. 3 shows a block diagram of the bi-directional current sensor 300 that includes a current-sense element (e.g. a current-sense resister 320) and a current-to-voltage converter 310 with an analog output 350, a digital output 360 and a digital input.

A block diagram of a battery module 100 implementing features of the invention is illustrated in FIGS. 1-3. The battery module 100 embodiment comprises a physically sealed battery based power source including a plurality of Lithium based battery cells 101 operatively coupled to subsystems having distinct functions that operate together to provide safe and reliable power from the battery module 100. See FIG. 1. The battery module 100 is enclosed within a substantially rectangular plastic battery housing and power from the battery module 100 is accessed through a positive battery terminal 104 and a negative battery terminal 105 that each penetrate and conduct electrical current to and from the battery module 100.

FIG. 1 illustrates an application of the invention wherein the battery cells 101 are coupled electrically to each other in series or "stacked" to accumulate or sum the individual battery cell voltages and create the accumulated battery module voltage 102 that is equivalent to the sum of each of the battery cell 101 minus small power losses from the individual battery cell terminals or any conductive connecters between or leading to and from the first and last battery cells 101. Balancing of the voltages on the battery cells 101 is accomplished using the battery cell balancer 130 and the microcontroller 110.

Battery cell 101 balancing comprises measurement, comparison and controlled discharge of selected battery cells 101 to closely balance or equalize the charges on each battery cell 101. Measurement of each battery cell 101 may be accomplished by coupling conductive voltage sensing inputs of a battery cell balancer 130 to the terminals of each battery cell 101 and controlling active components in the battery cell balancer 130 to correctively discharge any single battery cell 101 that has a sensed voltage greater than another battery cell 101 or another reference voltage provided to or within the balancer 130. Accordingly, the balancer 130 comprises a plurality of conductive connections that are respectively coupled to the positive and negative terminals of the individual battery cells 101 and allow a flow of discharge current from each battery cell 101. The illustrated battery cell balancer 130 is implemented with a plurality of analog-to-digital (A/D) converters with the inputs of each A/D converter coupled to one of the terminals of each battery cell 101. See FIG. 1. In the illustrated battery module 110 the inputs of each A/D converter comprise a first input and a second input that are connected to the negative terminal and positive terminal of each battery cell 101, respectively, to enable sampling or measurement of the voltage existing on each battery cell 101. The battery cell balancer 130 is coupled to a microcontroller 110 that compares the voltages on each of the battery cells 101 and directs corrective discharge feedback to the balancer 130 according to programming within the microcontroller 110.

Battery cell 101 voltages sampled from the battery cell balancer 130 are coupled to the microcontroller 110 for comparison and subsequent correction if necessary. Particularly, the outputs of the A/D converters in the cell balancer 130 are each coupled to an input/output port on the microcontroller 110 that is programmed to read the digital outputs from the A/D converters of the cell balancer 130 (i.e. "M4") into microcontroller memory. The microcontroller is programmed to compare the cell voltages and output corrective discharge feedback (i.e. "D3") that is coupled to the cell balancer 130 and controls the operation of a discharging circuit that may include active circuitry configured to discharge any individual battery cell 101 in the stack having excessive charge or exceeding a reference voltage. As one example, the corrective discharge feedback is applied to the gate of a Field Effect Transistor (FET) wherein the drain and source are coupled across the positive and negative terminals of the battery cell, respectively and the corrective discharge feedback causes the FET to drain current from the battery cell that requires discharging. Electrical isolation of the cell balancer 130 discharge circuitry may be provided by opto-couplers coupled between the discharge feedback from the microcontroller 110 and the cell balancer 130 discharge circuitry.

A thermistor and heater 160 is positioned in the thermal environment adjacent the battery cells 101 to both measure and affect battery cell 101 temperatures. The heater 160 comprises a resistive heating element that is coupled between the accumulated battery module voltage 102 and system ground. The thermistor ("Therm") may be coupled to the microcontroller 110 via an analog-to-digital converter to sample current measurements, which may be read-in by the microcontroller 110 to determine the temperature of the thermal environment adjacent the battery cells 101. As one example, the microcontroller 110 programming reads the thermistor measurements into memory and compares the measurements to internal reference values to determine whether the battery cells 101 are too cold to be safely charged and the heater 160 should be turned on to increase the temperature of the battery cell 101 environment. The microcontroller 110 can be programmed to turn on the heater 160 if the ambient temperature is below a threshold temperature (e.g. −10 degrees Celsius). The microcontroller 110 may turn on the heater 160 by closing a switch in the current path of the resistive heating element using a heater enable output ("EN_HTR"). Closing the switch allows current to flow through the resistive heating element and heat the environment adjacent the battery cells 101. Conversely, the microcontroller 110 may disable the heater 160 by opening the switch in the path of the resistive heating element.

A solid-state contactor 140 is electrically coupled in series between the battery cells 101 and the positive battery terminal 104 and has a CLOSED state and an OPEN state. When in the CLOSED state the contactor 140 allows current flow between the accumulated battery cell voltage 102 and the positive battery terminal 104. Conversely, when in the OPEN state the contactor 140 presents an open circuit or near infinite impedance between the accumulated battery cell voltage 102 and the positive battery terminal 104. The contactor 140 is coupled to or combined with a bi-directional current sensing circuit 300 to sense the magnitude and polarity of current flow to and from the battery module 100, which is indicative of engine or battery module 100 operating states and/or state changes.

An example of a bi-directional current sensing circuit 300 is illustrated in FIG. 3 and comprises a bi-directional current sense current-to-voltage converter ("I-V Converter") 310 that reproduces or amplifies the voltage differential produced by the current flowing through a current sense element (e.g. a current-sense resistor 320) that is electrically coupled in series between the positive battery terminal 104 and the engine cable that supplies power to the engine. The gain of the I-V Converter 310 may be programmably increased or decreased based on input from the microcontroller 110 to accommodate the current-use characteristics of alternate battery applications. The bi-directional current sensing circuit 300 may include an analog output 350 that outputs a proportional representation of the current flowing through the current sense element, which may be coupled to the microcontroller 110 via an analog-to-digital converter to enable measurement and capture of on-going current use data. One or more binary or digital outputs 360 may be coupled to the microcontroller 110 to provide output information that is representative of the current flowing through the current sense element. The illustrated bi-directional current sensing circuit 300 includes a two digit binary data/output that is representative of both the magnitude and polarity of the current flowing through the current sense element.

The contactor 140 has a disable input that is coupled to port of the microcontroller 140 ("ENGAGE") and is used to cause the contactor 140 to change states (i.e. "OPEN") and cause an open circuit in the path between the accumulated battery cell voltage 102 and the positive battery cell terminal 104. The OPEN state of the contactor 140 may be useful during programmed management of the battery module 100 or if the battery module 100 is subject to unsafe operating conditions that might damage the battery module 100 components. Unsafe operating conditions that cause the microcontroller 110 to toggle the ENGAGE output and cause an OPEN state of the contactor 140 include threats of both internal and external origin. Examples of internal threats include overcharged or undercharged battery cells 101, one or more failed or faulty battery cells 101, or battery cell 101 temperatures outside specified limits while the engine is running (i.e. "ENGINE_ON"). Each of the threats having internal origins can be detected by the microcontroller 110 programming and eliminated. External threats associated with extreme current magnitudes are detected with the bi-directional current sensing circuit 300.

Over-current conditions created externally to the battery module 100 can be detected and terminated before the battery module 100 is damaged or does damage to other engine components. If for example, the positive battery terminal 104 and negative battery terminal 105 are shorted (or during any other sustained over-current condition), a very large and sustained battery current will result in a sustained relatively large magnitude of current through the current-sense resistor 320 that the bi-directional current sensing circuit 300 will convey to the microcontroller 110 ("OVC"). The microcontroller 110 will immediately toggle the ENGAGE output to cause an OPEN state of the contactor 140 and end the short-circuit (or over-current condition). Similarly, a substantial change in battery current may indicate a significant change in the load impedance that can be detected by the microcontroller 110 and stored in memory or reported to the engine computer or transmitted to remote receivers. Finally, the contactor 140 OPEN state condition can also be selected based upon receipt of interrupts or other commands that are communicated to the microcontroller 110 from a communication 170 that is able to communicate with one or more remote wired or wireless transceivers.

Figure 4:
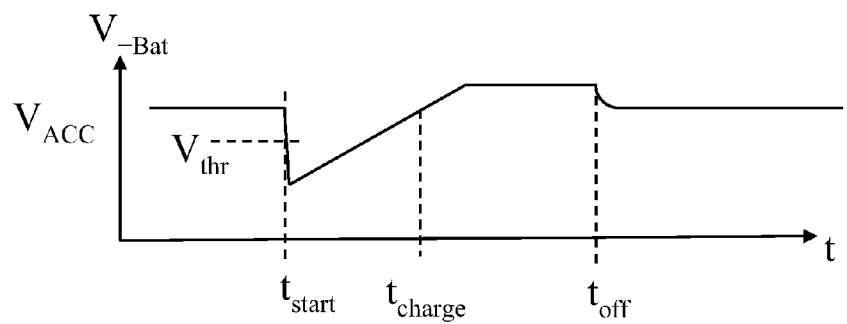
FIG. 4 illustrates the change in battery module 100 voltage over time due to a start event of an internal combustion engine.

The bi-directional current sensing circuit 300 may also be used under normal battery module 100 operating conditions to detect battery current consumption and engine operating states and state changes. As an example, the start event of an internal combustion engine as initiated by a starter-motor requires a sudden and relatively large inrush current. If the engine is in the OFF state, the contactor 140 is normally in the CLOSED state to allow battery current to flow from the battery module 100 to power a starter-motor for an engine start event. FIG. 4 illustrates the possible change in battery module voltage, $V_{+Bat}$, due to an engine start event and followed by an engine stop/off event. Before the engine start event, the battery module 100 produces voltage at the positive battery terminal 104 that is substantially equal to the accumulated battery cell 101 voltages, $V_{ACC}$. At an engine start event, $ts_{tart}$, the start-current flowing from the battery module 100 will be enough to reduce the battery module voltage to less than a programmable reference threshold voltage, $V_{thr}$, that is less than the original accumulated battery cell voltage, $V_{ACC}$, and preferably less than about seventy percent of the original accumulated battery cell 101 voltage. The microcontroller 110 programming detects each occurrence when the batter terminal 104 voltage decreases to less than the reference threshold voltage, which may be used internally within the microcontroller 110 as an interrupt (e.g. "IGNITION_ON") or communicated external to the battery module 100 or both.

After engine start and under normal operating conditions, the battery module 100 will provide current to the engine electrical system until a time, $t_{charge}$, (exaggerated in the drawing) when the alternator voltage applied to the positive battery terminal 104 just exceeds the accumulated battery cell voltage, $V_{ACC}$, and begins to charge the battery cells 101 by current flowing from the engine alternator, through the positive battery terminal 104 and contactor 140, to the battery cells 101. The microcontroller 110 programming may detect each occurrence when the battery terminal voltage 104 returns to or exceeds the original accumulated battery cell 101 voltage, $V_{ACC}$, which occurrences may be used internally within the microcontroller 110 as interrupt (e.g. "ENGINE_ON") or communicated external to the battery module 100 or both. Finally, the engine entering an off state, at $t_{off}$, results with the voltage at the positive battery terminal 104 decreasing or returning to substantially the same voltage as the original accumulated battery cell 101 voltage, $V_{ACC}$, and may correspond to an engine off ("ENGINE_OFF") signal/interrupt for the microcontroller 110.

Charging of the battery cells 101 by the manner described above is allowed provided that the current flowing from the positive battery terminal 104 to the battery cells 101 remains less than a programmed reference current chosen to ensure that a safe charging current is applied to the battery cells 101. Under certain conditions however, the current flowing from the positive battery terminal 104 to the battery cells 101 may exceed the programmed reference current and charging of the battery cells 101 is provided by the internal battery cell charger 150.

The battery cell charger 150 is electrically coupled 151 to the positive battery terminal 104 to provide controlled charge of the battery cells 110. The battery cell charger 150 has a charging output source 150a that is coupled to the battery cell 101 stack and that may source a safe charging current to the battery cells 101 as controlled by the microcontroller 110 programming. The charger 150 is coupled to the microcontroller 110 (i.e. at "EN-CHRG") and enabled or disabled ("'CHRG_DONE") by the microcontroller 110 based on whether the battery cells 101 require charging or have finished charging. In one example the microcontroller 110 directs the charger 150 to charge the battery cells 110 if charging current though the contactor 140 exceeds a safe level of charging current, or the voltage at the positive battery terminal 104 is greater than the accumulated battery cell voltage 102, or if the accumulated battery cell voltage 102 is below a reference voltage established by programing in the microcontroller 110.

A low power current path 180 (coupled electrically in parallel to the contactor 140) from the accumulated battery module voltage 102 to the positive battery terminal 104 allows power from the battery module 100 to power external components such as vehicle engine computers and the like. An exemplary low current path 180 comprises a diode ("D1") and resistor ("R1") coupled electrically in series from the accumulated battery module voltage 102 to the positive battery terminal 104 i.e. with the diode anode coupled to the accumulated battery module voltage 102, the diode cathode coupled to a first end of the resistor, and the other end of the resistor coupled to the positive battery terminal 104.

A voltage source multiplexer Vin Arbiter 120 powers a voltage regulator 125 that supplies internal power to the microcontroller 110. The Vin Arbiter 120 multiplexes power from the positive battery terminal 104 and accumulated battery module voltage 102 depending upon which voltage potential is greater. Thus, for example when the engine is in the ENGINE_ON state the Vin Arbiter 120 may select and power the voltage regulator 125 from the greater voltage potential of either the positive battery terminal 104 or from accumulated battery module voltage 102. And when the engine is in the ENGINE_OFF state the Vin Arbiter 120 selects and powers the voltage regulator 125 from the accumulated battery module voltage 102.

A communications link to and from the battery is provided via a wired or wireless link and facilitates communications with other battery communication links in other battery modules 100 or with other external or remote devices. For example, the microcontroller 110 can be programmed to communicate battery module 100 status information to engine computers or other external devices. Battery module 100 status information may include but is not limited to minimum battery cell voltage, current consumption, error messages, or occurrences of over-current or over-voltage conditions. The communications link is also useful to establish and maintain communications between battery modules 101 that are deployed in parallel or series to augment power requirements or accomplish battery module power 100 redundancies. As illustrated the communications link can a wired 175 (e.g. I2C® bus) or a wireless 170 (e.g. Bluetooth®) technology.

FIG. 2 for example illustrates an aggregated battery module 200 having a positive battery terminal 201 and a negative battery terminal 202 but is actually comprised of a plurality of self-contained and independently-internally managed battery modules 100 connected to achieve power objectives beyond that of a single battery module 100. In particular the aggregated battery module 200 comprises three subsets of battery modules 100 (i.e. the vertical stack of the three rows of battery modules 100 to accumulate "V+"), wherein each of subsets of battery modules 100 (e.g. have been coupled electrically in parallel to sum the battery module 100 current capabilities (i.e. the horizontal rows of four battery modules 100 to accumulate "I+"); and wherein the each of the three subsets of battery modules 100 are coupled in series to sum the voltage capabilities.

The problems normally associated with connecting batteries are addressed by monitoring and managing each of the battery modules 100 connected in parallel using the communications link. As an example, bottom row of battery modules 100 in FIG. 2 includes a master battery module 100a that monitors and manages operations battery modules 100b, 100c, 100d . . . that are electrically connected in parallel with the master battery module 100a. In operation, the master battery module 100a polls each of the other battery modules 100b, 100c, and 100d . . . for information regarding the status of each of the other battery modules 100b, 100c, 100d . . . and in particular the voltage of each individual battery cell in each of the other battery modules 100b, 100c, and 100d . . . and issues commands via the communications link to each of the microcontrollers 110b, 110c, 110d . . . , to balance each of the individual battery cell voltages to the lowest battery cell 101 voltage or alternatively, a common battery cell reference voltage as established by the master battery module 100a.

The communications links also enables battery management strategies that promote prolonged battery module 100 life or that facilitate redundant power. The master battery module 100a may run a program that controls the operation of battery modules 100b, 100c, and 100d, . . . . One preferred management strategy is to disconnect each battery module 100 for a time interval and allow the other batteries to supply aggregate power. Thus, in the example if there are N batteries in the aggregate battery module 200 the master battery module 100a will command one of the other battery modules 100b, 100c, and 100d, . . . to open its contactor 140b, 140c, or 140d, . . . respectively so that N−1 battery modules 100 are supplying power from the aggregate battery module 200 at any given time. Alternatively, the master battery module 100a may command more than one of the other battery modules 100b, 100c, and 100d, . . . to open its contactor 140b, 140c, or 140d, . . . respectively so that fewer than N−1 battery modules 100b, 100c, and 100d, . . . are supplying power from the aggregate battery module 200 at any given time.

Finally, the battery module 100 includes a visual status indicator such as a multi-color LED 190 that is coupled to a port on the microcontroller 110 that indicates one or more statuses by the intermittent or steady display of several colors lit by the multi-color LED 190. Moreover, an accelerometer can be included to ensure that one or more battery module 100 operations are not initiated if the battery module 100 is not in an upright orientation.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A method of managing a battery module, the battery module having a positive battery terminal and a negative battery terminal, a plurality of battery cells with an accumulated battery cell voltage, the battery module further includes a contactor coupled electrically in series between the accumulated battery cell voltage and the positive battery terminal, a charger that is coupled to the positive battery terminal and has a charger output coupled to the accumulated battery cell voltage, the method comprising:
    charging the plurality of battery cells by current flowing from the positive battery terminal through the contactor if the current flowing from the positive battery terminal through the contactor is less than a reference current by closing the contactor to create an closed circuit between the accumulated battery cell voltage and the positive battery terminal; and
    opening the contactor if the current flowing from the positive battery terminal through the contactor is greater than the reference current; and
    charging the plurality of battery cells by current flowing from the charger if the current flowing from the positive battery terminal through the contactor is greater than the reference current.

2. A method of managing a battery module, the battery module having a positive battery terminal and a negative battery terminal, a plurality of battery cells with an accumulated battery cell voltage, the battery module further includes a contactor coupled electrically in series between the accumulated battery cell voltage and the positive battery terminal, a charger that is coupled to the positive battery terminal and has a charger output coupled to the accumulated battery cell voltage, a communication link coupled to a receiver external to the battery module, the method comprising:
    opening the contactor to create an open circuit between the accumulated battery cell voltage and the positive battery terminal to prohibit sourcing current from the battery module;
    closing the contactor to create an closed circuit between the accumulated battery cell voltage and the positive battery terminal;
    charging the plurality of battery cells from the charger when the open circuit exists between the accumulated battery cell voltage and the positive battery terminal;
    charging the plurality of battery cells from the positive battery terminal when the closed circuit exists between the accumulated battery cell voltage and the positive battery terminal;
    sensing an original accumulated battery cell voltage;
    detecting each occurrence wherein the accumulated battery cell voltage decreases at least twenty percent below the original accumulated battery cell voltage; and
    transmitting via the communication link an indication of each occurrence wherein the accumulated battery cell voltage decreased at least twenty percent below the original accumulated battery cell voltage to the receiver.

3. The method in claim 2 further comprising:
    detecting each subsequent occurrence wherein the accumulated battery cell voltage increases above the original accumulated battery cell voltage;
    detecting each subsequent occurrence wherein the accumulated battery cell voltage decreases to a voltage that is within five percent of the original accumulated battery cell voltage; and
    transmitting via the communication link an indication of each occurrence wherein the accumulated battery cell voltage decreases to a voltage that is within five percent of the original accumulated battery cell voltage to the receiver.

4. An aggregate battery, comprising:
    a plurality of battery modules each battery module including
        a positive battery terminal and a negative battery terminal,
        a plurality of battery cells electrically coupled in series to create an accumulated battery cell voltage,
        a contactor coupled between the positive battery terminal and the accumulated battery cell voltage, the contactor with an open state that prohibits current flow and a closed state that permits current flow,
        a charger coupled between the positive battery terminal and the accumulated battery cell voltage, and
        a battery cell balancer coupled to the plurality of battery cells,
        a microcontroller coupled to and having a process to control each of the contactor, the charger, and the battery cell balancer, and
        a communications link coupled to the microcontroller for communicating with at least one of the other plurality of battery modules;
    wherein a first subset of the plurality of battery modules have the positive battery terminals coupled together and the negative battery terminals coupled together, respectively, the communications link of each of the first subset wirelessly coupled to the communication link in at least one of the other battery modules in the first subset.

5. The aggregate battery in claim 4 further comprising:
a second subset of the plurality of battery modules have the positive battery terminals coupled together and the negative battery cells coupled together, respectively, the communications link of each of the second subset wirelessly coupled with the communication link in at least one of the other battery modules, and the negative terminals of the second subset coupled to the positive battery terminals of the first subset.

6. The aggregate battery in claim 5 wherein,
each of the second subset of the plurality of battery modules are wirelessly coupled with the communication link in one of the battery modules in the first subset.

* * * * *